(12) United States Patent
Lee (10) Patent No.: US 12,145,663 B2
(45) Date of Patent: Nov. 19, 2024

(54) RACK-DRIVEN ELECTRIC POWER ASSISTED STEERING DEVICE

(71) Applicant: HL MANDO CORPORATION, Pyeongtaek-si (KR)

(72) Inventor: Jong Baek Lee, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 572 days.

(21) Appl. No.: 17/436,422

(22) PCT Filed: Feb. 25, 2020

(86) PCT No.: PCT/KR2020/002670
§ 371 (c)(1),
(2) Date: Sep. 3, 2021

(87) PCT Pub. No.: WO2020/184866
PCT Pub. Date: Sep. 17, 2020

(65) Prior Publication Data
US 2022/0126909 A1 Apr. 28, 2022

(30) Foreign Application Priority Data
Mar. 8, 2019 (KR) .................. 10-2019-0026684

(51) Int. Cl.
*B62D 5/04* (2006.01)
*B62D 5/00* (2006.01)

(52) U.S. Cl.
CPC .......... *B62D 5/0448* (2013.01); *B62D 5/003* (2013.01); *B62D 5/0424* (2013.01)

(58) Field of Classification Search
CPC .......... B60Y 2306/09; B60Y 2400/307; B62D 3/12; B62D 5/003; B62D 5/0421;
(Continued)

(56) References Cited

U.S. PATENT DOCUMENTS 8,307,940 B2   11/2012   Bugosh et al.

FOREIGN PATENT DOCUMENTS

CN   1040665 A     3/1990
CN   101001778 A   7/2007
(Continued)

OTHER PUBLICATIONS

International Search Report (PCT/ISA/210) issued in PCT Application No. PCT/KR2020/002670 dated Jun. 5, 2020 with English Translation.
(Continued)

*Primary Examiner* — Jacob D Knutson
*Assistant Examiner* — Felicia L. Brittman-Alabi
(74) *Attorney, Agent, or Firm* — Hauptman Ham, LLP (57) ABSTRACT

A rack-driven electric power assisted steering device includes a rack bar which axially slides in a rack housing and has an outer circumferential screw groove formed at the outer circumferential surface thereof; a ball nut which has an inner circumferential screw groove formed at the inner circumferential surface thereof and corresponding to the outer circumferential screw groove of the rack bar, and has a ball circulation passage formed between the inner and outer circumferential surfaces thereof, the ball circulation passage passing through the ball nut in the axial direction; end caps coupled to ends of the ball circulation passage, each of the end caps having a ball return hole provided to circulate balls through the ball circulation passage, the outer circumferential screw groove, and the inner circumferential screw groove; and a support member coupled to the inner circumferential surface of the ball nut while axially supporting the end caps.

17 Claims, 11 Drawing Sheets

(58) Field of Classification Search
CPC .. B62D 5/0424; B62D 5/0448; B62D 5/0463; F16H 25/2214
USPC ........................................................ 180/444
See application file for complete search history.

(56) References Cited

FOREIGN PATENT DOCUMENTS

| CN | 201794883 U | 4/2011 |
| --- | --- | --- |
| CN | 102252040 A | 11/2011 |
| CN | 202429239 U | 9/2012 |
| CN | 102791561 A | 11/2012 |
| CN | 102803770 A | 11/2012 |
| CN | 202541628 U | 11/2012 |
| CN | 103171615 A | 6/2013 |
| CN | 103608608 A | 2/2014 |
| CN | 104015786 A | 9/2014 |
| CN | 204415499 U | 6/2015 |
| CN | 107444482 A | 12/2017 |
| DE | 10 2014 002 286 A1 | 8/2014 |
| JP | 2008-143343 A | 6/2008 |
| JP | 2017-214956 A | 12/2017 |
| KR | 10-2012-0045598 A | 5/2012 |
| KR | 10-2012-0118157 A | 10/2012 |
| KR | 10-2013-0084418 A | 7/2013 |
| KR | 10-2016-0053207 A | 5/2016 |
| KR | 20160053207 A * | 5/2016 ........... B62D 5/0409 |

OTHER PUBLICATIONS

Korean language Written Opinion (PCT/ISA/237) issued in PCT Application No. PCT/KR2020/002670 dated Jun. 5, 2020.
Chinese Office Action issued on Dec. 15, 2023, in connection with the Chinese Patent Application No. 202080019723.X, with partial English translation (14 pages).
Notice of Allowance issued on May 23, 2024 for corresponding Chinese Patent Application No. 202080019723, along with an English machine translation (10 pages).
Guang Kuo et al., "Parametric design of recirculating ball-type electric power steering gear", Beijing Information Science and Technology University, ISSN: 1009-0134, vol. 37, Issue 3, Part 2, Mar. 25, 2015, pp. 117-119, along with an English machine translation.

* cited by examiner

RACK-DRIVEN ELECTRIC POWER ASSISTED STEERING DEVICE

CROSS-REFERENCE OF RELATED APPLICATIONS

This application is the U.S. National Phase under 35 U.S.C. § 371 of International Patent Application No. PCT/KR2020/002670, filed on Feb. 25, 2020, which claims the benefit of Korean Patent Application No. 10-2019-0026684, filed on Mar. 8, 2019, the entire disclosures of each are incorporated by reference herein.

TECHNICAL FIELD

The present embodiments relate to a rack-driven power assisted steering device, and more specifically, to a rack-driven power assisted steering device with which it is possible to increase driving stability and durability while reducing costs and assembly processes by simplifying the structure and decreasing the number of parts equipped in a ball circulation stricture of a ball nut and a rack bar.

BACKGROUND ART

In general, a conventional electric power-assisted steering device has a ball nut, which is connected with a motor and a belt, and a rack bar, which is slid by rotation of a motor pulley, a nut pulley, and the ball nut, as components that transfer the driving force of the motor to the rack bar and generate steering assist force so as to assist the user's steering force.

However, such a conventional electric power-assisted steering device suffers from increased costs and assembly processes due to a complicated structure and many components equipped in the ball circulation structure of the ball nut and the rack bar.

Further, frequent failure occurs in the equipped components due to, e.g., vibrations from the operation of the ball nut and the rack bar when the ball nut rotates to slide the rack bar or impact loads reversely coming from the road, deteriorating driving stability and durability.

DETAILED DESCRIPTION OF THE INVENTION

Technical Problem

The present embodiments have been conceived in the above-described background and aim to increase driving stability and durability while reducing costs and assembly processes by simplifying the structure and decreasing the number of parts equipped in a ball circulation stricture of a ball nut and a rack bar in a rack-driven power-assisted steering device.

The objects of the present embodiments are not limited to the foregoing and other objects will be apparent to one of ordinary skill in the art from the following detailed description.

Technical Solution

According to the present embodiments, there is provided a rack-driven power-assisted steering device, comprising a rack bar axially sliding inside a rack housing and having an outer circumferential screw groove formed in an outer circumferential surface thereof, a ball nut having an inner circumferential screw groove formed in an inner circumferential surface thereof, the inner circumferential screw groove corresponding to the outer circumferential screw groove of the rack bar, a ball circulation path axially formed through the ball nut between the inner circumferential surface and the outer circumferential surface, an end cap having a ball return hole to circulate a ball along the ball circulation path, the outer circumferential screw groove, and the inner circumferential screw groove, the end cap coupled to each of a first end and a second end of the ball circulation path, and a supporting member coupled to the inner circumferential surface of the ball nut while axially supporting the end cap.

Advantageous Effects

According to the present embodiments, it is possible to reduce costs and assembly processes by simplifying the structure and decreasing the number of parts equipped in a ball circulation stricture of a ball nut and a rack bar.

Further, according to the present embodiments, it is possible to increase driving stability and durability by reducing failures in components due to vibrations from the operation of the ball nut and the rack bar or impact loads reversely coming from the road.

MODE FOR CARRYING OUT THE INVENTION

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

Figure 1:
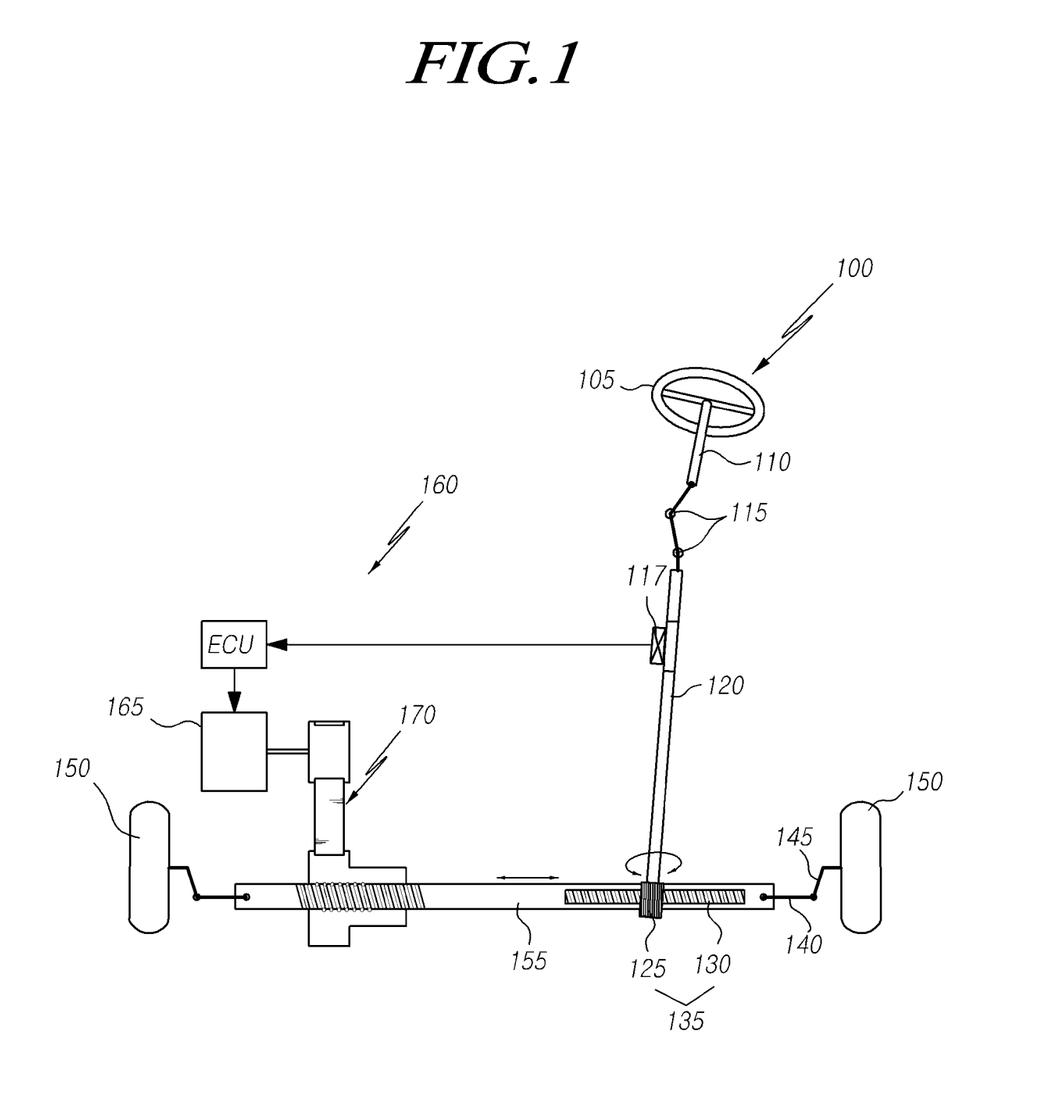
FIG. 1 is a partial cross-sectional view schematically illustrating a rack-driven power-assisted steering device according to the present embodiments.
Figure 2:
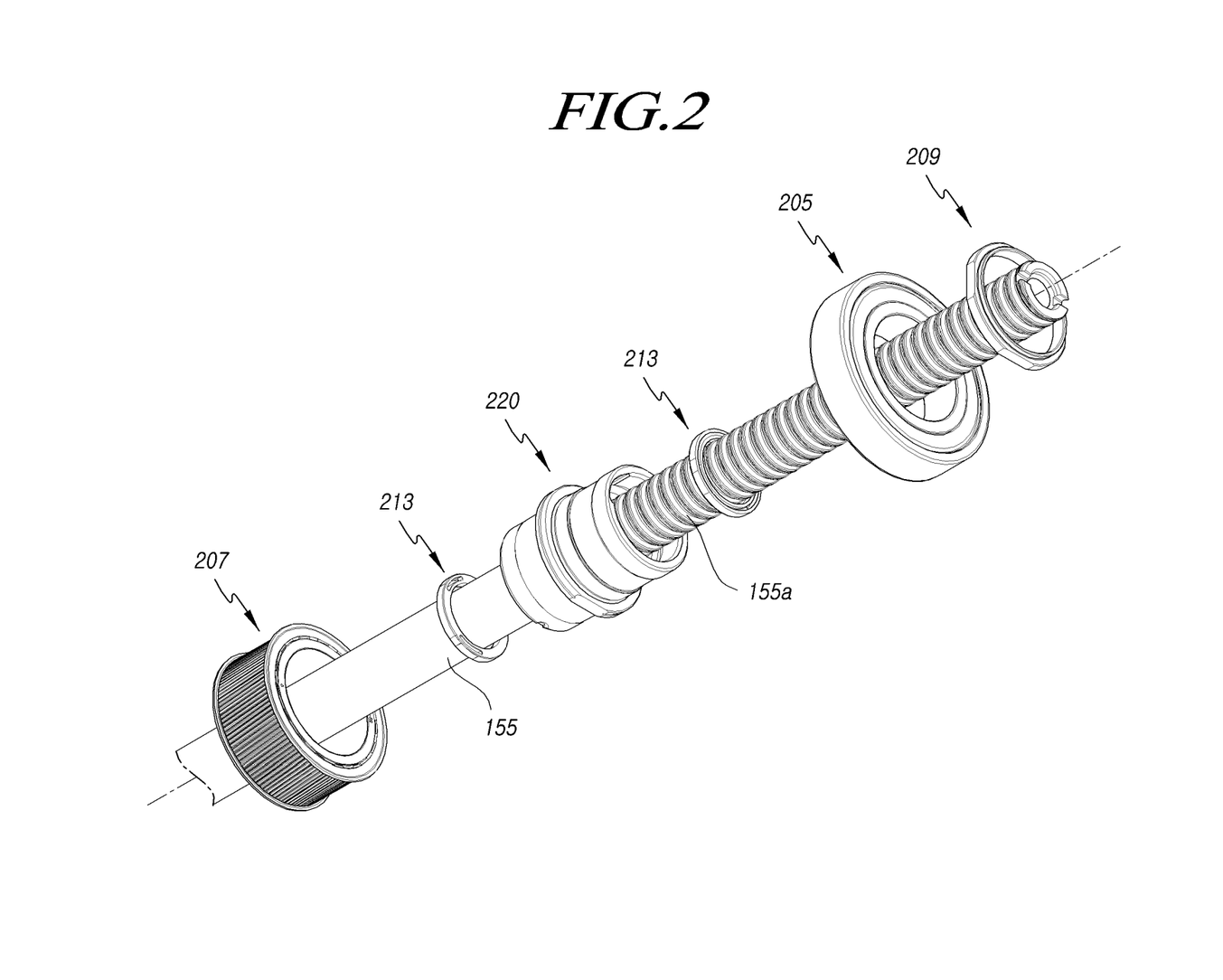
FIG. 2 is an exploded perspective view illustrating a portion of a rack-driven power-assisted steering device according to the present embodiments.
Figure 3:
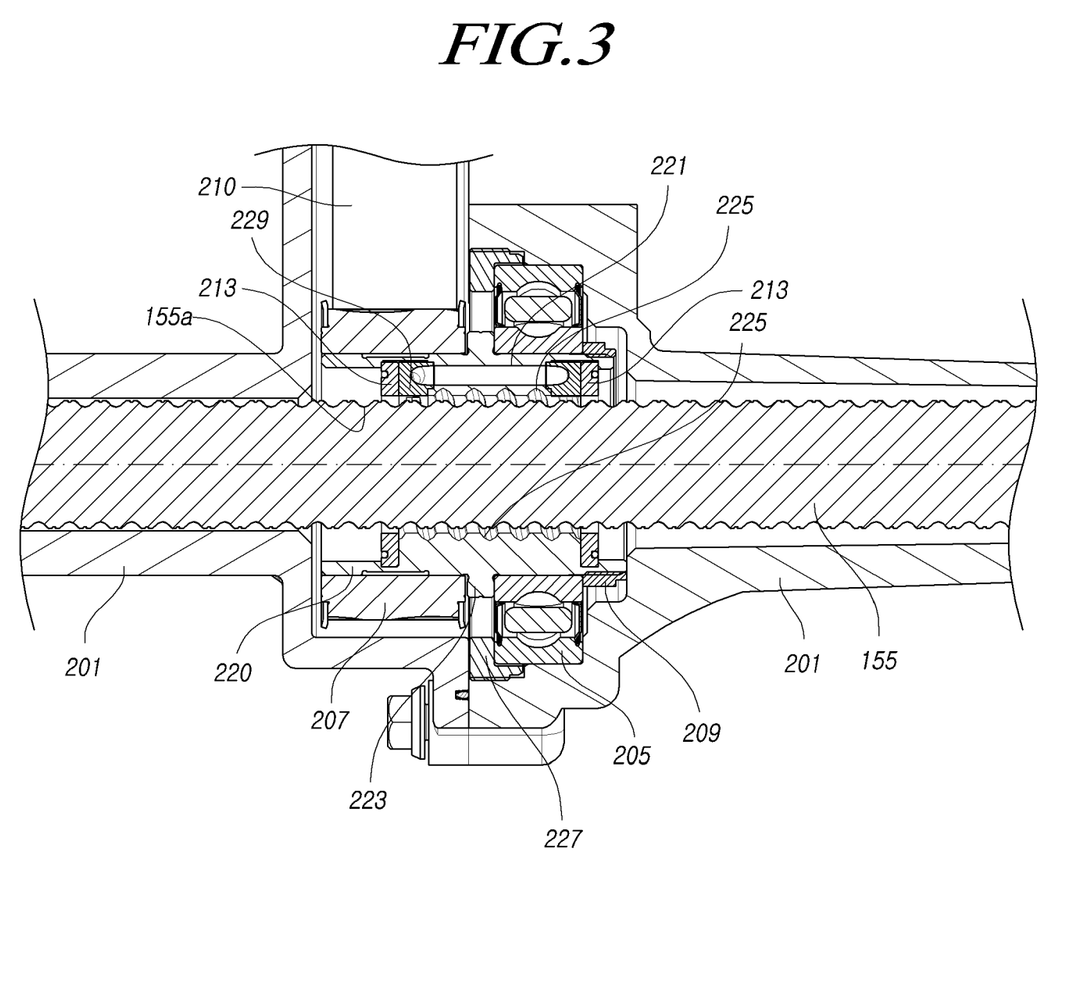
FIGS. 3 to 11 are cross-sectional views illustrating a portion of a rack-driven power-assisted steering device according to the present embodiments.
Figure 4:
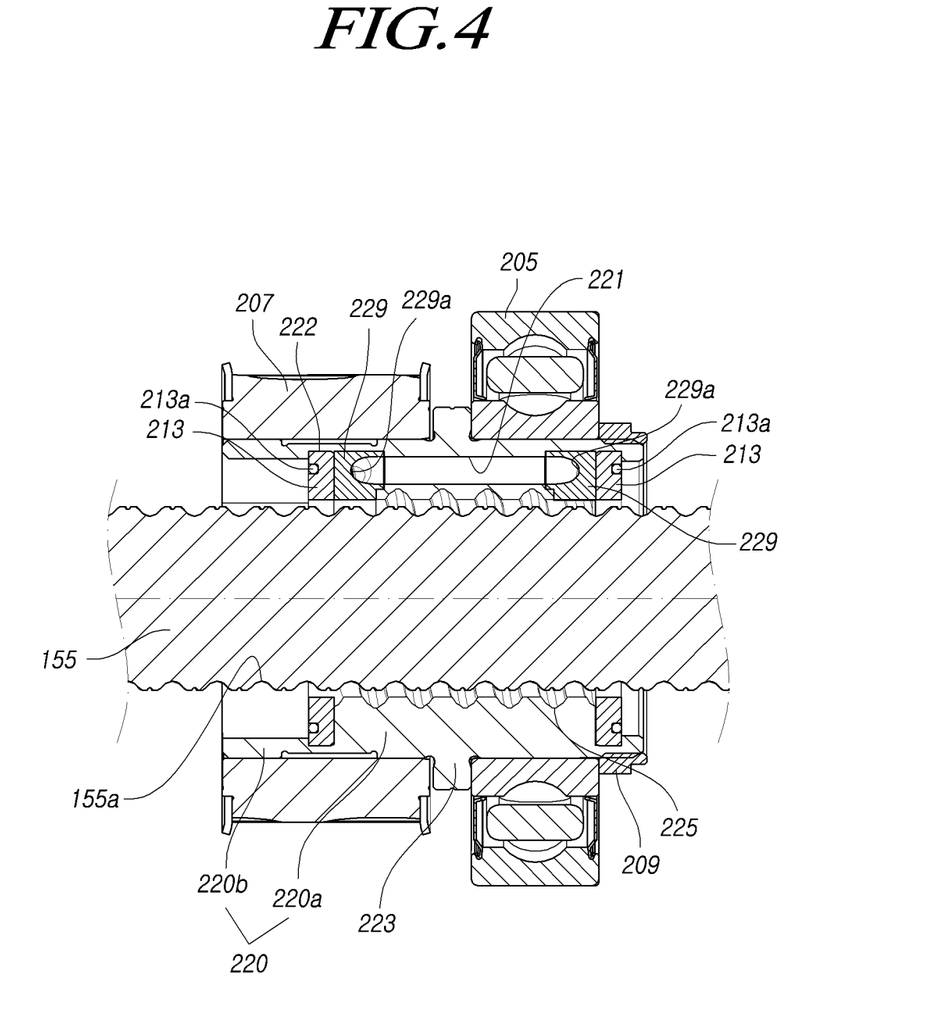
Figure 5:
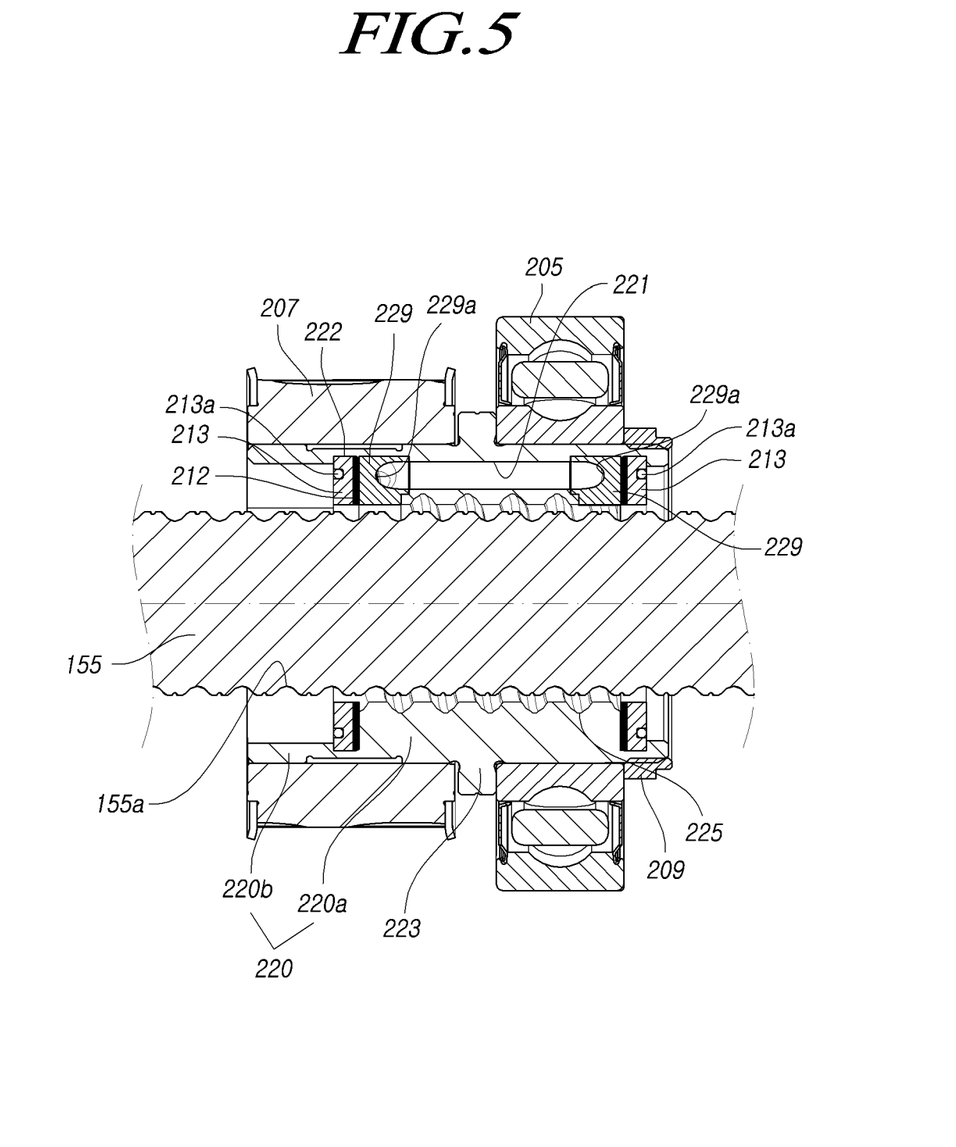
Figure 6:
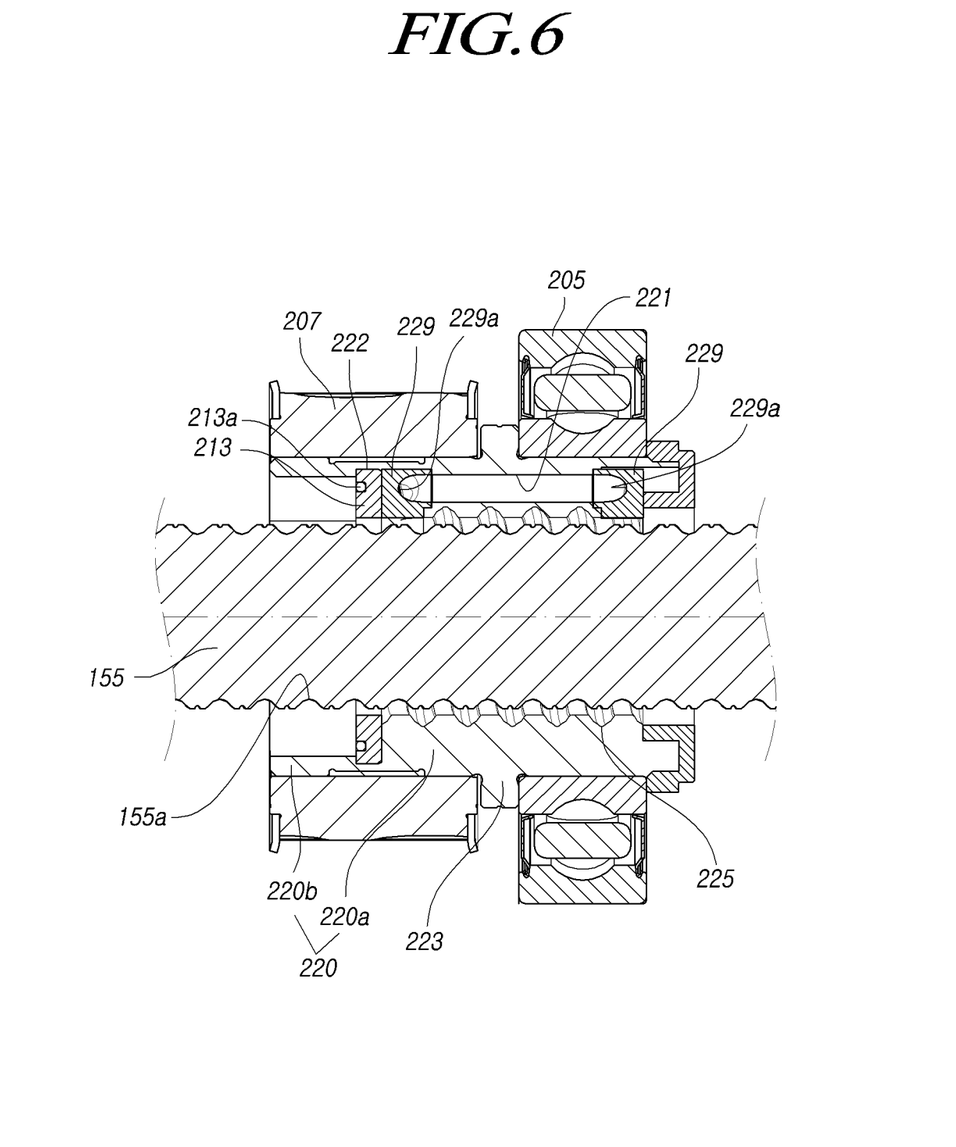
Figure 7:
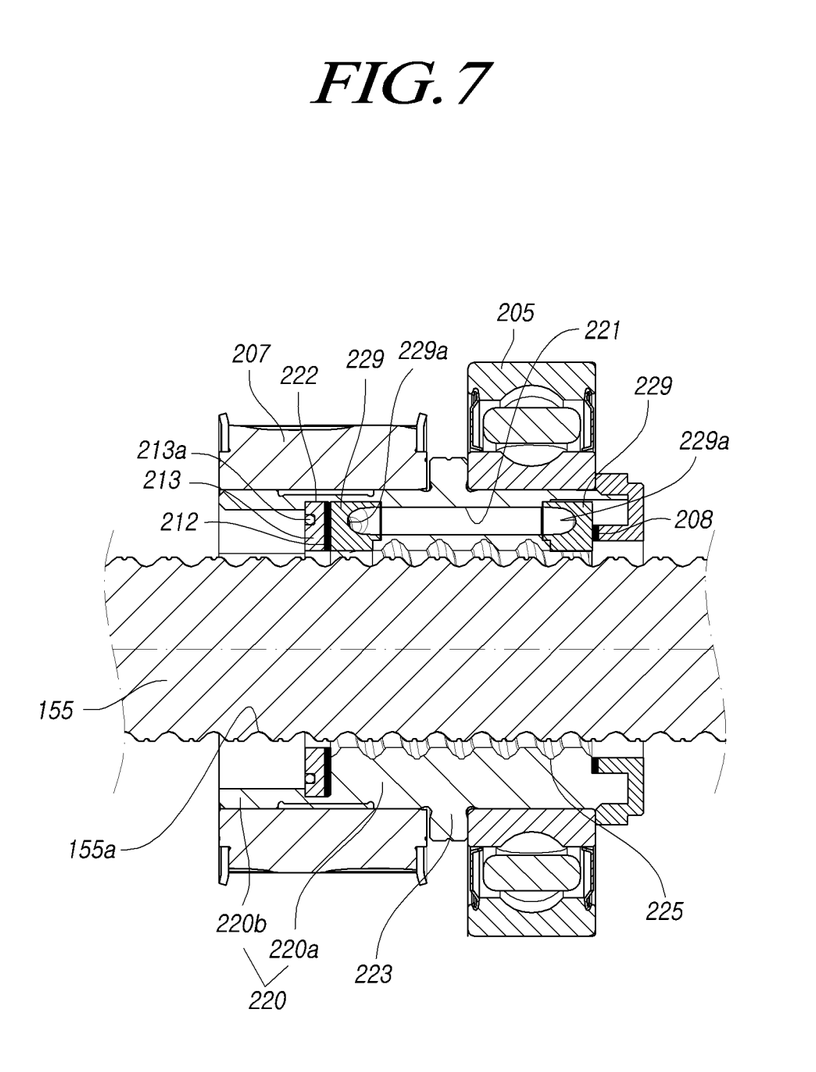

FIG. 1 is a partial cross-sectional view schematically illustrating a rack-driven power-assisted steering device according to the present embodiments. FIG. 2 is an exploded perspective view illustrating a portion of a rack-driven power-assisted steering device according to the present embodiments. FIGS. 3 to 11 are cross-sectional views illustrating a portion of a rack-driven power-assisted steering device according to the present embodiments.

As illustrated in the drawings, according to the present embodiments, a rack-driven power-assisted steering device includes a rack bar 155 axially sliding inside a rack housing 201 and having an outer circumferential screw groove 155a formed in an outer circumferential surface thereof, a ball nut 220 having an inner circumferential screw groove 225 formed in an inner circumferential surface thereof, the inner circumferential screw groove 225 corresponding to the outer circumferential screw groove 155a of the rack bar 155, a ball circulation path 221 axially formed through the ball nut 220 between the inner circumferential surface and the outer circumferential surface, an end cap 229 having a ball return hole 229a to circulate a ball along the ball circulation path 221, the outer circumferential screw groove 155a, and the inner circumferential screw groove 225, the end cap 229 coupled to each of a first end and a second end of the ball circulation path 221, and a supporting member 213 coupled to the inner circumferential surface of the ball nut 220 while axially supporting the end cap 229.

First, referring to FIG. 1, the rack-driven power-assisted steering device according to the present embodiments includes a steering system 100 connected from a steering wheel 105 to two opposite wheels 150 and an auxiliary power mechanism 160 supplying steering assist power to the steering system.

The steering system 100 includes a steering shaft 110 having an upper end connected to the steering wheel 105 to rotate along with the steering wheel 105 and a lower end connected to a pinion shaft 120 via a pair of universal joints 115.

Further, the pinion shaft 120 is connected to a rack bar 155 through a rack-pinion mechanism part 135, and two opposite ends of the rack bar 155 are connected to the wheels 150 of the vehicle through tie rods 140 and knuckle arms 145.

The rack-pinion mechanism part 135 is formed as a pinion gear 125 formed at a lower end of the pinion shaft 120 is engaged with a rack gear 130 formed on a side of the outer circumstantial surface of the rack bar 155.

The auxiliary power mechanism 160 includes a torque sensor 117 that detects the steering torque applied to the steering wheel 105 by the driver and outputs an electrical signal proportional to the detected steering torque, an electronic control unit ECU that generates a control signal based on the electrical signal provided from the torque sensor 117, a motor 165 that generates steering assist power based on the control signal provided from the electronic control unit, and a belt-type transmission device 170 that transfers the assist power generated from the motor 165 to the rack bar 155 via a belt.

Such a rack-driven power-assisted steering device includes a driving means and a driven means. The driving means includes the motor 165 controlled by the electronic control unit ECU, a motor pulley coupled to the shaft of the motor, and the belt 210.

The driven means includes a ball nut 220 supporting the rack bar 155 in the inside of a rack housing 201 surrounding the rack bar 155 and a nut pulley 207 coupled to the outer circumferential surface of the ball nut 220.

The motor pulley connected to the motor and the nut pulley 207 connected to the rack bar 155 are disposed so that their rotation axes are parallel to each other. The belt 210 is wound around the motor pulley and the nut pulley 207 to transfer the rotational force of the motor to the rack bar 155 through the ball nut 220. By the operation of the ball nut 220, the rack bar is moved left and right, generating steering assist power.

The ball nut 220 is coupled with the rack bar 155 via a ball (not shown) and, while rotating, slide the rack bar 155 inside of the rack housing 201. The nut pulley 207 is coupled to one side of the outer circumferential surface of the ball nut 220 to rotate the ball nut 220, and a bearing 205 is mounted on another side of the outer circumferential surface of the ball nut 220 to support rotation.

A power transmission structure is prepared on the outer circumferential surface of the rack bar 155 and the inner circumferential surface of the ball nut 220 to axially slide the rack bar 155 to generate steering assist power. The power transmission structure includes an outer circumferential screw groove 155a spirally formed in the outer circumferential surface of the rack bar and having a semi-circular or arc-shaped cross section, a ball inserted thereto, and an inner circumferential screw groove 225 spirally formed in the inner circumferential surface of the ball nut 220 to correspond to the outer circumferential screw groove 155a and having a semi-circular or arc-shaped cross section.

The ball nut 220 is a hollow tube having the inner circumferential screw groove 225 formed in the inner circumferential surface thereof. A lock screw 227 is provided at an end of the outer ring of the bearing 205 coupled to the outer circumferential surface of the ball nut 220 and is screwed to the inner circumferential surface of the rack housing 201 to be fixed while supporting the bearing 205.

Further, a ball circulation path 221 is formed on one side of the ball nut 220, and the ball circulation path 221. The end caps 229 have ball return holes 229a to allow the ball to circulate along the ball circulation path 221, the outer circumferential screw groove 155a, and the inner circumferential screw groove 225 and are coupled to two opposite sides of the ball circulation path 221.

The ball nut 220 includes a small-diameter portion 220a having the inner circumferential screw groove 225 and a large-diameter portion 220b having an enlarged inner diameter at two opposite ends of the small-diameter portion 220a. A supporting member 213 is coupled to the inner circumferential surface of the large-diameter portion 220b to axially support the end cap 229.

The supporting member 213 is coupled to the stepped portion where the large-diameter portion 220b and the small-diameter portion 220a are connected in a state of being elastically deformed inwardly in the radial direction.

The nut pulley 207 is coupled with a tolerance ring that radially generates elastic force between the nut pulley 207 and the outer circumferential surface of the ball nut 220 and is thus prevented from escaping off the ball nut 220.

The lock screw 227 is screwed to the inner circumferential surface of the rack housing 201, on a first side of the outer ring of the bearing 205, supporting the outer ring of the bearing 205. A bearing supporting member 209 is screwed to the outer circumferential surface of the ball nut 220, on a second side of the inner ring of the bearing 205, supporting the bearing 205.

The bearing 205 is slidably assembled onto the outer circumferential surface of the ball nut 220, and the first side of the inner ring of the bearing 205 is supported and fixed to a seating portion 223 having an enlarged diameter in a substantially middle portion of the ball nut 220.

An insertion recess 222 is formed in the inner circumferential surface of the large-diameter portion 220b of the ball nut 220 to allow the supporting member 213 to be inserted thereto, so that the supporting member 213 is supported in the insertion recess 222 while fastening the end cap 229.

The supporting member 213 is formed in an annular shape so that a radial outer end thereof is inserted into the insertion recess 222, and a radial inner end thereof is formed to reach up to the inner circumferential surface of the small-diameter portion 220a.

The supporting member 213 is formed of an elastic, ring-shaped plastic material to be elastically deformed inward in the radial direction if fitted into the insertion recess 222, thus facilitating assembly. Further, the supporting member 213 may be formed in an annular shape with a cutout in a side thereof.

Figure 8:
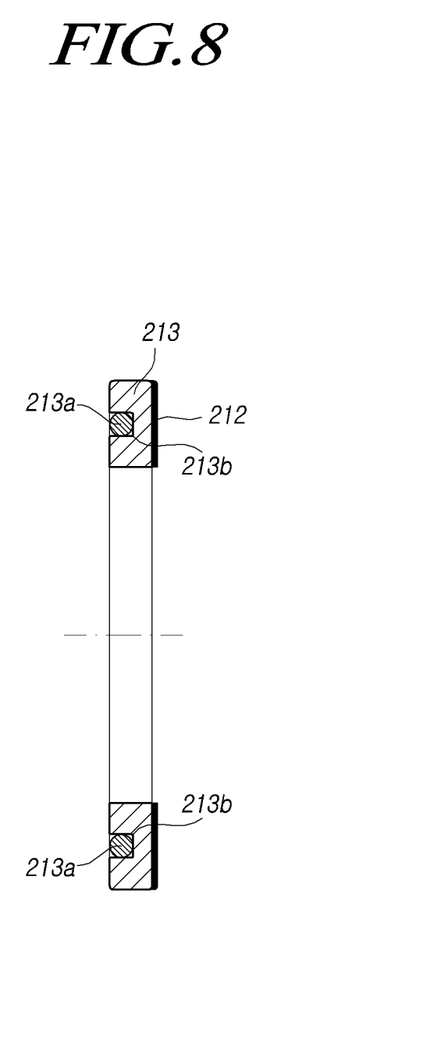

Further, as illustrated in FIG. 8, the supporting member 213 has a seating groove 213b formed in the axial outer surface, and an elastic member 213a for elastically supporting the supporting member 213 in the radial direction may be fitted into the seating groove 213b.

The elastic member 213a is formed in an annular shape having a cutout in one circumferential side thereof and is elastically deformed and fitted into the seating groove 213b of the supporting member 213 to radially produce an elastic restoring force.

Figure 9:
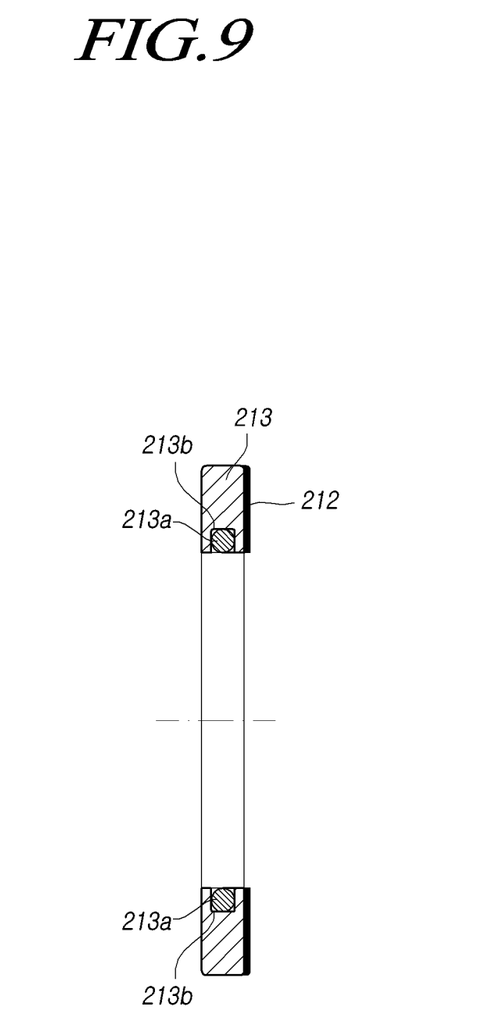

Further, as illustrated in FIG. 9, the supporting member 213 may have a seating groove 213b formed in the inner circumferential surface, and the elastic member 213a for elastically supporting the supporting member 213 in the radial direction may be fitted into the seating groove 213b.

In this case, the elastic member 213a is formed in an annular shape having a cutout in a circumferential side thereof as described above and, after fitted to the seating groove 213b of the supporting member 213, the elastic member 213a elastically supports the supporting member 213 outward in the radial direction.

Further, the supporting member 213 is provided with a damper 212 on one side supporting the end cap 229 to absorb vibration and noise of the ball circulating along the end cap 229.

A bearing supporting member 209 is coupled to an axial end of the ball nut 220 to axially support the bearing 205 for supporting the rotation of the ball nut 220 and to prevent it from escaping off.

Figure 10:
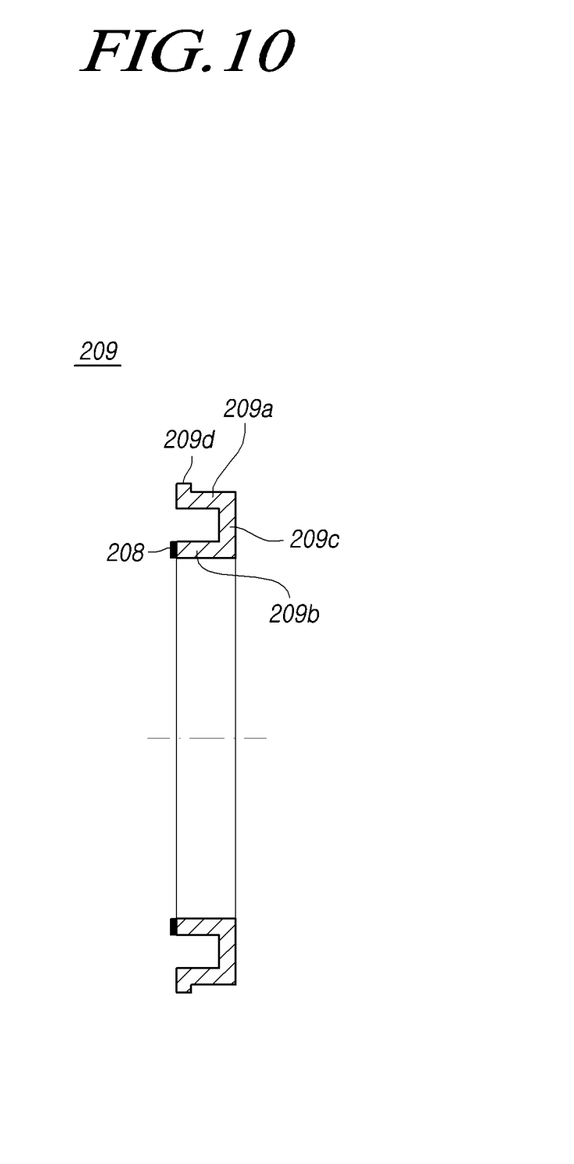
Figure 11:
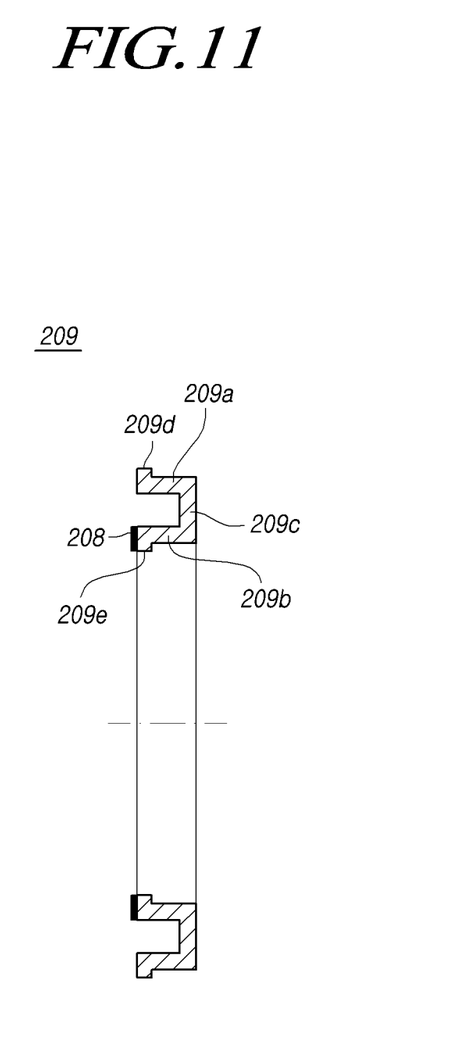

As illustrated in FIGS. 10 and 11, the bearing supporting member 209 includes an outer coupling portion 209a coupled to the outer circumferential surface of the ball nut 220, an inner coupling portion 209b coupled to the inner circumferential surface of the ball nut 220 to axially support the end cap 229, and a side portion 209c connecting them.

The inner coupling portion 209b is provided with a damper 208 on one side supporting the end cap 229 to absorb vibration and noise of the ball circulating along the end cap 229.

The side portion 209c of the bearing supporting member 209 is coupled to support an end of the ball nut 220. The outer and inner ends of the side portion 209c are connected to the outer coupling portion 209a and the inner coupling portion 209b, respectively, so that it is coupled to wrap around the outer circumstantial surface and the inner circumstantial surface of the end of the ball nut 220.

A screw portion is formed on the inner circumferential surface of the outer coupling portion 209a to be screwed with the screw portion formed on the outer circumferential surface of the ball nut 220, or a screw portion is formed on the outer circumferential surface of the inner coupling portion 209b to be screwed with the screw portion formed on the inner circumferential surface of the ball nut 220.

Thus, the bearing supporting member 209 is screwed to the end of the ball nut 220, supporting and fixing the bearing 205 and the end cap 229.

At an end of the outer coupling portion 209a, an outer supporting end 209d may radially and outwardly protrude to support the inner ring of the bearing 205, thereby increasing the supporting area for the inner ring of the bearing 205 and hence allowing for stable support. Further, as a tool is supported by the stepped portion of the outer supporting end 209d when the bearing supporting member 209 is coupled, assembly may be facilitated.

Further, as illustrated in FIG. 11, at an end of the inner coupling portion 209b, an inner supporting end 209e may radially and inwardly protrude to support the side surface of the end cap 229, thereby increasing the supporting area for the end cap 229 and allowing for more stable support of the side surface of the end cap 229.

According to the present embodiments, it is possible to reduce costs and assembly processes by simplifying the structure and decreasing the number of parts equipped in a ball circulation stricture of a ball nut and a rack bar.

Further, according to the present embodiments, it is possible to increase driving stability and durability by reducing failures in components due to vibrations from the operation of the ball nut and the rack bar or impact loads reversely coming from the road.

Although it is described above that all of the components are combined into one or are operated in combination, embodiments of the disclosure are not limited thereto. One or more of the components may be selectively combined and operated as long as it falls within the scope of the objects of the embodiments.

When an element "comprises," "includes," or "has" another element, the element may further include, but rather than excluding, the other element, and the terms "comprise," "include," and "have" should be appreciated as not excluding the possibility of presence or adding one or more features, numbers, steps, operations, elements, parts, or combinations thereof. All the scientific and technical terms as used herein may be the same in meaning as those commonly appreciated by a skilled artisan in the art unless defined otherwise. It will be further understood that terms, such as those defined dictionaries, should be interpreted as having a meaning that is consistent with their meaning in the context of the relevant art and will not be interpreted in an idealized or overly formal sense unless expressly so defined herein.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The invention claimed is:

1. A rack-driven power-assisted steering device, comprising:
   a rack bar axially sliding inside a rack housing and having an outer circumferential screw groove formed in an outer circumferential surface thereof;
   a ball nut having an inner circumferential screw groove formed in an inner circumferential surface thereof, the inner circumferential screw groove corresponding to the outer circumferential screw groove of the rack bar, a ball circulation path axially formed through the ball nut between the inner circumferential surface and the outer circumferential surface;
   an end cap having a ball return hole to circulate a ball along the ball circulation path, the outer circumferential screw groove, and the inner circumferential screw groove, the end cap coupled to each of a first end and a second end of the ball circulation path; and
   a supporting member coupled to the inner circumferential surface of the ball nut while axially supporting the end cap,
   wherein the ball nut has a small-diameter portion and a large-diameter portion at the inner circumferential surface thereof, the small-diameter portion having the inner circumferential screw groove, and the large-diameter portion having a larger diameter and provided on two opposite ends of the small-diameter portion, and wherein the supporting member is coupled to an inner circumferential surface of the large-diameter portion,
   wherein the supporting member has a seating groove in an axial outer surface thereof, and wherein an elastic member is fitted into the seating groove to elastically support the supporting member radially.

2. The rack-driven power-assisted steering device of claim 1, wherein the supporting member is coupled to a stepped portion where the large-diameter portion and the small-diameter portion are connected together.

3. The rack-driven power-assisted steering device of claim 1, wherein insertion recesses are formed in two opposite sides of the inner circumferential surface of the large-diameter portion to fit over the supporting member.

4. The rack-driven power-assisted steering device of claim 3, wherein the supporting member is formed in an annular shape having a radial outer end fitted into the insertion recesses and a radial inner end formed up to an inner circumferential surface of the small-diameter portion.

5. The rack-driven power-assisted steering device of claim 1, wherein the supporting member is formed of an annular elastic plastic material.

6. The rack-driven power-assisted steering device of claim 1, wherein the supporting member is formed of an annular elastic plastic material having a cutout in a side thereof.

7. The rack-driven power-assisted steering device of claim 1, wherein the elastic member is formed in an annular shape having a cutout in a circumferential side thereof.

8. The rack-driven power-assisted steering device of claim 1, wherein the supporting member has a damper on a side surface supporting the end cap.

9. A rack-driven power-assisted steering device, comprising:
   a rack bar axially sliding inside a rack housing and having an outer circumferential screw groove formed in an outer circumferential surface thereof;
   a ball nut having an inner circumferential screw groove formed in an inner circumferential surface thereof, the inner circumferential screw groove corresponding to the outer circumferential screw groove of the rack bar, a ball circulation path axially formed through the ball nut between the inner circumferential surface and the outer circumferential surface;
   an end cap having a ball return hole to circulate a ball along the ball circulation path, the outer circumferential screw groove, and the inner circumferential screw groove, the end cap coupled to each of a first end and a second end of the ball circulation path; and
   a supporting member coupled to the inner circumferential surface of the ball nut while axially supporting the end cap,
   wherein the ball nut has a small-diameter portion and a large-diameter portion at the inner circumferential surface thereof, the small-diameter portion having the inner circumferential screw groove, and the large-diameter portion having a larger diameter and provided on two opposite ends of the small-diameter portion, and wherein the supporting member is coupled to an inner circumferential surface of the large-diameter portion,
   wherein the supporting member has a seating groove in an inner circumferential surface thereof, and wherein an elastic member is fitted into the seating groove to elastically support the supporting member radially.

10. The rack-driven power-assisted steering device of claim 9, wherein the elastic member is formed in an annular shape having a cutout in a circumferential side thereof.

11. A rack-driven power-assisted steering device, comprising:
    a rack bar axially sliding inside a rack housing and having an outer circumferential screw groove formed in an outer circumferential surface thereof;
    a ball nut having an inner circumferential screw groove formed in an inner circumferential surface thereof, the inner circumferential screw groove corresponding to the outer circumferential screw groove of the rack bar, a ball circulation path axially formed through the ball nut between the inner circumferential surface and the outer circumferential surface;
    an end cap having a ball return hole to circulate a ball along the ball circulation path, the outer circumferential screw groove, and the inner circumferential screw groove, the end cap coupled to each of a first end and a second end of the ball circulation path; and
    a supporting member coupled to the inner circumferential surface of the ball nut while axially supporting the end cap,
    wherein a bearing supporting member is coupled to an axial end of the ball nut to axially support a bearing supporting rotation of the ball nut and to prevent the bearing from sliding off,
    wherein the bearing supporting member includes an outer coupling portion coupled to the outer circumferential surface of the ball nut and an inner coupling portion coupled to the inner circumferential surface of the ball nut to axially support the end cap.

12. The rack-driven power-assisted steering device of claim 11, wherein the inner coupling portion has a damper on a side surface supporting the end cap.

13. The rack-driven power-assisted steering device of claim 12, wherein the bearing supporting member includes a side portion supporting an end of the ball nut, and wherein an outer end and an inner end of the side portion are connected to the outer coupling portion and the inner coupling portion, respectively.

14. The rack-driven power-assisted steering device of claim 13, wherein a screw portion is formed in an inner circumferential surface of the outer coupling portion to be screwed with a screw portion formed in the outer circumferential surface of the ball nut.

15. The rack-driven power-assisted steering device of claim 14, wherein a screw portion is formed in an outer circumferential surface of the inner coupling portion to be screwed with a screw portion formed in the inner circumferential surface of the ball nut.

16. The rack-driven power-assisted steering device of claim 15, wherein an outer supporting end, radially and outwardly protruding, is formed at an end of the outer coupling portion to support an inner ring of the bearing.

17. The rack-driven power-assisted steering device of claim 16, wherein an inner supporting end, radially and inwardly protruding, is formed at an end of the inner coupling portion to support a side surface of the end cap.

\* \* \* \* \*